(12) United States Patent
Kuri et al.

(10) Patent No.: US 11,825,477 B2
(45) Date of Patent: *Nov. 21, 2023

(54) SYSTEM AND METHOD FOR PERFORMING RESOURCE ALLOCATION IN RADIO COMMUNICATION

(71) Applicant: Panasonic Holdings Corporation, Osaka (JP)

(72) Inventors: Kenichi Kuri, Osaka (JP); Akihiko Nishio, Osaka (JP); Masaru Fukuoka, Ishikawa (JP); Kenichi Miyoshi, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,671

(22) Filed: Oct. 14, 2022

(65) Prior Publication Data

US 2023/0036157 A1 Feb. 2, 2023

Related U.S. Application Data

(63) Continuation of application No. 16/843,222, filed on Apr. 8, 2020, now Pat. No. 11,503,572, which is a (Continued)

(30) Foreign Application Priority Data

Apr. 28, 2006 (JP) .................................. 2006-126454

(51) Int. Cl.
*H04W 72/04* (2023.01)
*H04W 72/20* (2023.01)
(Continued)

(52) U.S. Cl.
CPC .......... *H04W 72/20* (2023.01); *H04B 7/0619* (2013.01); *H04B 7/12* (2013.01);
(Continued)

(58) Field of Classification Search
CPC . H04L 25/0228; H04L 5/0037; H04L 5/0007; H04L 5/0053; H04L 5/0094;
(Continued)

(56) References Cited

U.S. PATENT DOCUMENTS 6,553,011 B1 4/2003 Yan et al.
6,650,905 B1 11/2003 Toskala et al.
(Continued)

FOREIGN PATENT DOCUMENTS

CN 1222046 A 7/1999
CN 1761182 A 4/2006
(Continued)

OTHER PUBLICATIONS

English Translation of Chinese Search Report dated Sep. 15, 2015, for CN Patent Application No. 2013100086370. (2 pages).
(Continued)

*Primary Examiner* — Man U Phan
(74) *Attorney, Agent, or Firm* — Seed IP Law Group LLP

(57) ABSTRACT

Provided is a base station capable of suppressing increase of overhead of allocation result report in frequency scheduling in multi-carrier communication and obtaining a sufficient frequency diversity effect. In the base station, encoding units (101-1 to 101-*n*) encode data (#1 to #n) to mobile stations (#1 to #n), modulation units (102-1 to 102-*n*) modulate the encoded data so as to generate a data symbol, a scheduler (103) performs frequency scheduling according to a CQI from each mobile station so as to uniformly allocate data to the respective mobile stations for a part of RB extracted from a plurality of RB, and an SCCH generation unit (105)
(Continued)

generates control information (SCCH information) to report the allocation result in the scheduler (103) to the respective mobile stations.

18 Claims, 16 Drawing Sheets

Related U.S. Application Data continuation of application No. 16/126,730, filed on Sep. 10, 2018, now Pat. No. 10,652,863, which is a continuation of application No. 15/673,263, filed on Aug. 9, 2017, now Pat. No. 10,104,644, which is a continuation of application No. 15/356,359, filed on Nov. 18, 2016, now Pat. No. 9,763,250, which is a continuation of application No. 14/668,747, filed on Mar. 25, 2015, now Pat. No. 9,629,126, which is a continuation of application No. 13/750,681, filed on Jan. 25, 2013, now Pat. No. 9,019,920, which is a continuation of application No. 13/357,430, filed on Jan. 24, 2012, now Pat. No. 8,385,287, which is a continuation of application No. 13/081,727, filed on Apr. 7, 2011, now Pat. No. 8,249,013, which is a continuation of application No. 12/298,707, filed as application No. PCT/JP2007/059089 on Apr. 26, 2007, now Pat. No. 8,077,667.

(51) Int. Cl.
| | |
|---|---|
| *H04B 7/06* | (2006.01) |
| *H04L 5/00* | (2006.01) |
| *H04W 72/23* | (2023.01) |
| *H04W 72/0453* | (2023.01) |
| *H04B 7/12* | (2006.01) |
| *H04W 4/00* | (2018.01) |
| *H04L 25/02* | (2006.01) |
| *H04W 28/06* | (2009.01) |
| *H04W 48/08* | (2009.01) |
| *H04W 88/08* | (2009.01) |

(52) U.S. Cl.
CPC .......... *H04L 5/0007* (2013.01); *H04L 5/0037* (2013.01); *H04L 5/0053* (2013.01); *H04L 5/0071* (2013.01); *H04L 5/0094* (2013.01); *H04W 4/00* (2013.01); *H04W 72/0453* (2013.01); *H04W 72/23* (2023.01); *H04L 5/006* (2013.01); *H04L 25/0228* (2013.01); *H04W 28/06* (2013.01); *H04W 48/08* (2013.01); *H04W 88/08* (2013.01)

(58) Field of Classification Search
CPC ......... H04L 5/006; H04L 5/0071; H04L 5/00; H04L 7/12; H04B 7/12; H04B 7/0619; H04B 7/06; H04W 88/08; H04W 72/0453; H04W 4/00; H04W 72/0406; H04W 48/02; H04W 28/06; H04W 72/042; H04W 72/04
USPC ...................................................... 370/329
See application file for complete search history.

(56) References Cited

U.S. PATENT DOCUMENTS

| | | | |
|---|---|---|---|
| 7,031,721 B2 | 4/2006 | Marinier | |
| 7,146,172 B2* | 12/2006 | Li | H04L 27/2602 455/448 |
| 7,209,711 B2* | 4/2007 | Terry | H04L 1/0009 370/332 |
| 7,355,962 B2 | 4/2008 | Li et al. | |
| 7,489,934 B2* | 2/2009 | Li | H04L 27/2601 455/448 |
| 7,551,937 B2 | 6/2009 | Kim et al. | |
| 7,573,805 B2 | 8/2009 | Zhuang et al. | |
| 7,782,896 B2 | 8/2010 | Kuri et al. | |
| 7,826,415 B2 | 11/2010 | Oh et al. | |
| 7,852,807 B2 | 12/2010 | Nishio et al. | |
| 7,933,238 B2 | 4/2011 | Sartori et al. | |
| 8,041,362 B2 | 10/2011 | Li et al. | |
| 8,126,464 B2 | 2/2012 | Aoyama | |
| 8,743,729 B2* | 6/2014 | Li | H04L 5/0035 455/452.2 |
| 8,934,445 B2* | 1/2015 | Li | H04W 74/04 370/329 |
| 9,191,138 B2* | 11/2015 | Li | H04J 11/005 |
| 9,210,708 B1* | 12/2015 | Li | H04L 27/2601 |
| 2002/0122410 A1 | 9/2002 | Kulikov et al. | |
| 2002/0168944 A1* | 11/2002 | Terry | H04W 72/542 455/67.11 |
| 2003/0169681 A1 | 9/2003 | Li et al. | |
| 2003/0174643 A1 | 9/2003 | Ro et al. | |
| 2005/0053035 A1 | 3/2005 | Kwak et al. | |
| 2005/0124352 A1* | 6/2005 | Fernandez-Corbaton | H04W 72/54 455/452.2 |
| 2005/0249127 A1 | 11/2005 | Huo et al. | |
| 2006/0039318 A1 | 2/2006 | Oh et al. | |
| 2006/0195752 A1 | 8/2006 | Walker et al. | |
| 2007/0086406 A1* | 4/2007 | Papasakellariou | H04W 16/04 370/480 |
| 2007/0140106 A1 | 6/2007 | Tsai et al. | |
| 2008/0081655 A1 | 4/2008 | Shin et al. | |
| 2008/0186880 A1 | 8/2008 | Seki et al. | |
| 2008/0232240 A1 | 9/2008 | Baum et al. | |
| 2008/0291860 A1 | 11/2008 | Vijayan et al. | |
| 2009/0117931 A1 | 5/2009 | Shin et al. | |
| 2009/0129330 A1 | 5/2009 | Kim et al. | |
| 2009/0196249 A1 | 8/2009 | Kawamura et al. | |
| 2009/0220017 A1 | 9/2009 | Kawamura et al. | |
| 2009/0252125 A1 | 10/2009 | Vujcic | |
| 2009/0303950 A1 | 12/2009 | Ofuji et al. | |
| 2010/0061345 A1 | 3/2010 | Wengerter et al. | |
| 2010/0069106 A1 | 3/2010 | Swarts et al. | |
| 2010/0157913 A1 | 6/2010 | Nagata et al. | |
| 2010/0188984 A1 | 7/2010 | Futagi et al. | |
| 2010/0202377 A1 | 8/2010 | Nishio et al. | |
| 2010/0309873 A1 | 12/2010 | Nishio et al. | |

FOREIGN PATENT DOCUMENTS

| | | |
|---|---|---|
| EP | 0892509 A2 | 1/1999 |
| EP | 1509016 A1 | 2/2005 |
| EP | 1628498 A2 | 2/2006 |
| JP | 2004537875 A | 12/2004 |
| JP | 2005323385 A | 11/2005 |
| KR | 2003-0075117 A | 9/2003 |
| WO | 2004086636 A2 | 10/2004 |

OTHER PUBLICATIONS

Extended European Search Report, dated May 7, 2012, for European Patent Application No. 07742524.7-2411. (8 pages).
Extended European Search Report, dated May 7, 2012, for European Patent Application No. 12161758.3-2411. (9 pages).
Intel Corporation, "Text Proposal for downlink OFDMA resource allocation and mapping rules for distributed mode users in E-UTRA, with discussion on control information," R1-061659, Agenda Item: 5.2, 3GPP TSG RAN WG1 LTE Ad Hoc Meeting #45, Cannes, France, Jun. 20, 2006. (7 pages).
International Search Report, dated Aug. 7, 2007, for International Patent Application No. PCT/JP2007/059089. (3 pages) (with English Translation).
Indian Office Action, dated Nov. 25, 2019, for Indian Patent Application No. 201628024329. (8 pages).
Japanese Notice of the Reasons for Rejection, dated Jul. 13, 2010.

(56) References Cited

OTHER PUBLICATIONS

LG Electronics, "Downlink resource allocation," R1-050835, Agenda Item: 10.4, 3GPP TSG RAN WG1#42, London, United Kingdom, Aug. 29-Sep. 2, 2005. (4 pages).

Motorola, "Resource Allocation mapping rules and TP," R1-060400, Agenda Item: 13.1.3, 3GPP TSG RAN1#44, Denver, USA, Feb. 13-17, 2006. (4 pages).

Nokia, "Resource block allocation—mapping rules," R1-060286, Agenda Item: 13.1.3, 3GPP TSG RAN WG1 #44 Meeting, Denver, USA, Feb. 13-17, 2006. (5 pages).

Nokia, "DL Resource block allocation and DL signaling," R1-060820, Agenda Item: 10.1.1, 3GPP TSG RAN WG1 #44bis Meeting, Athens, Greece, Mar. 27-31, 2006. (9 pages).

Nortel, "Resource block allocation for downlink data transmission for E-UTRA," R1-060649, Agenda Item: 13.1.3, 3GPP TSG-Ran Working Group 1 Meeting #44, Denver, Colorado, USA, Feb. 13-17, 2006. (3 pages).

Nortel, "Performance comparison between Diversity Physical Resource Block (PRB) and Localised PRB," R1-060896, Agenda Item: 10.1.5, 3GPP TSG RAN WG1 Meeting #44bis, Athens, Greece, Mar. 27-31, 2006. (9 pages).

NTT DoCoMo, Ericsson, Fujitsu, Mitsubishi Electric Corporation, NEC, Sharp, Toshiba Corporation, "L1/L2 Control Channel Structure for E-UTRA Downlink," R1-060032, Agenda Item: 5.1.2.3, 3GPP TSG-RAN WG1 LTE Ad Hoc Meeting, Helsinki, Finland, Jan. 23-25, 2006. (9 pages).

NTT DoCoMo, Ericsson, Fujitsu, Mitsubishi Electric, NEC, Nokia, Panasonic, Sharp, Toshiba Corporation, "Distributed FDMA Transmission for Shared Data Channel in E-UTRA Downlink," R1-060305, Agenda Item: 13.1.3, 3GPP TSG-RAN WG1 Meeting #44, Denver, USA, Feb. 13-17, 2006. (15 pages).

NTT DoCoMo, Ericsson, Fujitsu, Mitsubishi Electric, Motorola, NEC, Nokia, Panasonic, Sharp, Toshiba Corporation, "Distributed FDMA Transmission for Shared Data Channel in E-UTRA Downlink," R1-060777 (Original R1-060305), Agenda Item: 10.1.1, 3GPP TSG-RAN WG1 Meeting #44bis, Athens, Greece, Mar. 27-31, 2006. (14 pages).

Philips, "Distributed transmission in E-UTRA downlink," Tdoc R1-060843, Agenda Item: 10.1.5, 3GPP TSG RAN WG1 meeting #44bis, Athens, Greece, Mar. 27-31, 2006. (5 pages).

Samsung, "Downlink Channelization and Multiplexing for EUTRA," R1-050604, Agenda Item: 4.1, 3GPP TSG RAN WG1 Ad Hoc on LTE, Sophia Antipolis, France, Jun. 20-21, 2005. (9 pages).

Samsung, "Rules for mapping VRBs to PRBs," R1-060808, Agenda Item: 10.1, 3GPP RAN WG1 Meeting #44bis, Athens, Greece, Mar. 27-31, 2006. (5 pages).

Siemens, "Downlink resource multiplexing," R1-060839, Agenda Item: 10.1.1, 3GPP TSG RAN WG1#44bis, Athens, Greece, Mar. 27-31, 2006. (3 pages).

Texas Instruments, "Location Signaling Avoidance for Distributed Resource Block Allocation," R1-060855, Agenda Item: 10.1.1, 3GPP TSG RAN#44bis, Athens, Greece, Mar. 27-31, 2006. (4 pages).

* cited by examiner

| ASSIGNMENT VRB | SIGNALING BIT |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |

FIG.7

SYSTEM AND METHOD FOR PERFORMING RESOURCE ALLOCATION IN RADIO COMMUNICATION

CROSS-REFERENCE TO RELATED APPLICATIONS

This is a continuation of application number 16/843,222, filed Apr. 8, 2020 (Now U.S. Pat. No. 11,503,572), which is a continuation of application Ser. No. 16/126,730, filed Sep. 10, 2018 (Now U.S. Pat. No. 10,652,863), which is a continuation of application Ser. No. 15/673,263, filed Aug. 9, 2017 (Now U.S. Pat. No. 10,104,644), which is a continuation of application Ser. No. 15/356,359, filed Nov. 18, 2016 (Now U.S. Pat. No. 9,763,250), which is a continuation of application Ser. No. 14/668,747, filed Mar. 25, 2015 (Now U.S. Pat. No. 9,629,126), which is a continuation of application Ser. No. 13/750,681, filed Jan. 25, 2013 (Now U.S. Pat. No. 9,019,920), which is a continuation of application Ser. No. 13/357,430 filed Jan. 24, 2012 (Now U.S. Pat. No. 8,385,287), which is a continuation of application Ser. No. 13/081,727 filed Apr. 7, 2011 (Now U.S. Pat. No. 8,249,013), which is a continuation of application Ser. No. 12/298,707 filed Oct. 27, 2008 (Now U.S. Pat. No. 8,077,667), which is a national stage of PCT/JP2007/059089 filed Apr. 26, 2007, which is based on Japanese Application No. 2006-126454 filed Apr. 28, 2006, the entire contents of each which are incorporated by reference herein.

TECHNICAL FIELD

The present invention relates to a radio communication base station apparatus and radio communication method used for multicarrier communication.

BACKGROUND ART

Recently, in radio communication, and mobile communication in particular, various kinds of information such as image and data in addition to speech are targeted for transmission. Demands for higher speed transmission are expected to further increase in the future, and radio transmission techniques that efficiently use limited frequency resources and realize high transmission efficiency are in demand to perform high speed transmission.

One radio transmission technique that responds to these demands is OFDM (Orthogonal Frequency Division Multiplexing). OFDM is a multicarrier transmission technique of transmitting data in parallel using many subcarriers, has features such as high-frequency efficiency and reduced inter-symbol interference in a multipath environment, and is known to be effective in improving transmission efficiency.

Studies are underway to perform frequency scheduling when this OFDM is used in a downlink and data for a plurality of radio communication mobile station apparatuses (hereinafter simply "mobile stations") is assigned to a plurality of subcarriers (e.g., see Non-Patent Document 1). According to frequency scheduling, a radio communication base station apparatus (hereinafter simply "base station") adaptively assigns subcarriers to mobile stations based on received qualities of frequency bands of the mobile stations, so that it is possible to obtain a maximum multi-user diversity effect and perform communication quite efficiently.

Frequency scheduling is generally performed in units of resource blocks (RB's) acquired by making sets of several subcarriers into blocks. Furthermore, there are two assignment methods in frequency scheduling, namely, localized assignment, which is assignment in units of a plurality of consecutive subcarriers, and distributed assignment, in which assignment is performed for a plurality of distributed inconsecutive subcarriers.

Furthermore, the assignment result of frequency scheduling performed in a base station is reported to mobile stations using a shared control channel (SCCH). Further, studies are underway to report an assignment result of the frequency bandwidth of 5 MHz with one SCCH (e.g., see Non-Patent Document 2).

Non-Patent Document 1: R1-050604 "Downlink Channelization and Multiplexing for EUTRA", 3GPP TSG-RAN WG1 Ad Hoc on LTE, Sophia Antipolis, France, 20-21 Jun., 2005

Non-Patent Document 2: R1-060032, "L1/L2 Control Channel Structure for E-UTRA Downlink", NTT DoCoMo, 3GPP TSG-RAN WG1 LTE Ad Hoc Meeting contribution, 2006/01

DISCLOSURE OF INVENTION

Problems to be Solved by the Invention

Here, to improve the frequency diversity effect in distributed assignment, widening the frequency bandwidth targeted for distributed assignment, that is, increasing the number of subcarriers for which distributed assignment is performed, is possible. However, an increase of the number of subcarriers for which distributed assignment is performed causes an increase of the number of assignment patterns, and, accordingly, more signaling bits are needed to report the assignment results. This results in an increase of the overhead for reporting assignment results using SCCH's. As described above, in frequency scheduling, there is a relationship of trade-off between a frequency diversity effect and overhead for reporting assignment results.

It is therefore an object of the present invention, according to one aspect, to provide a base station and a radio communication method for obtaining a sufficient frequency diversity effect in frequency scheduling while reducing an increase of the overhead for reporting assignment results.

Means for Solving the Problem

The base station of the present invention used in a radio communication system in which a plurality of subcarriers forming a multicarrier signal are divided into a plurality of resource blocks, employs a configuration having: a scheduling section that equally assigns data for a radio communication mobile station apparatus to partial resource blocks equally extracted from the plurality of resource blocks; a generating section that generates control information to report an assignment result in the scheduling section to the radio communication mobile station apparatus; and a transmitting section that transmits the control information to the radio communication mobile station apparatus.

Advantageous Effect of the Invention

According to the present invention, it is possible to obtain a sufficient frequency diversity effect in frequency scheduling while reducing an increase of the overhead for reporting assignment results.

BRIEF DESCRIPTION OF DRAWINGS

FIG. 7 is a signaling bit example according to an embodiment of the present invention;

BEST MODE FOR CARRYING OUT THE INVENTION

Now, an embodiment of the present invention will be described below in detail with reference to the accompanying drawings.

Figure 1:
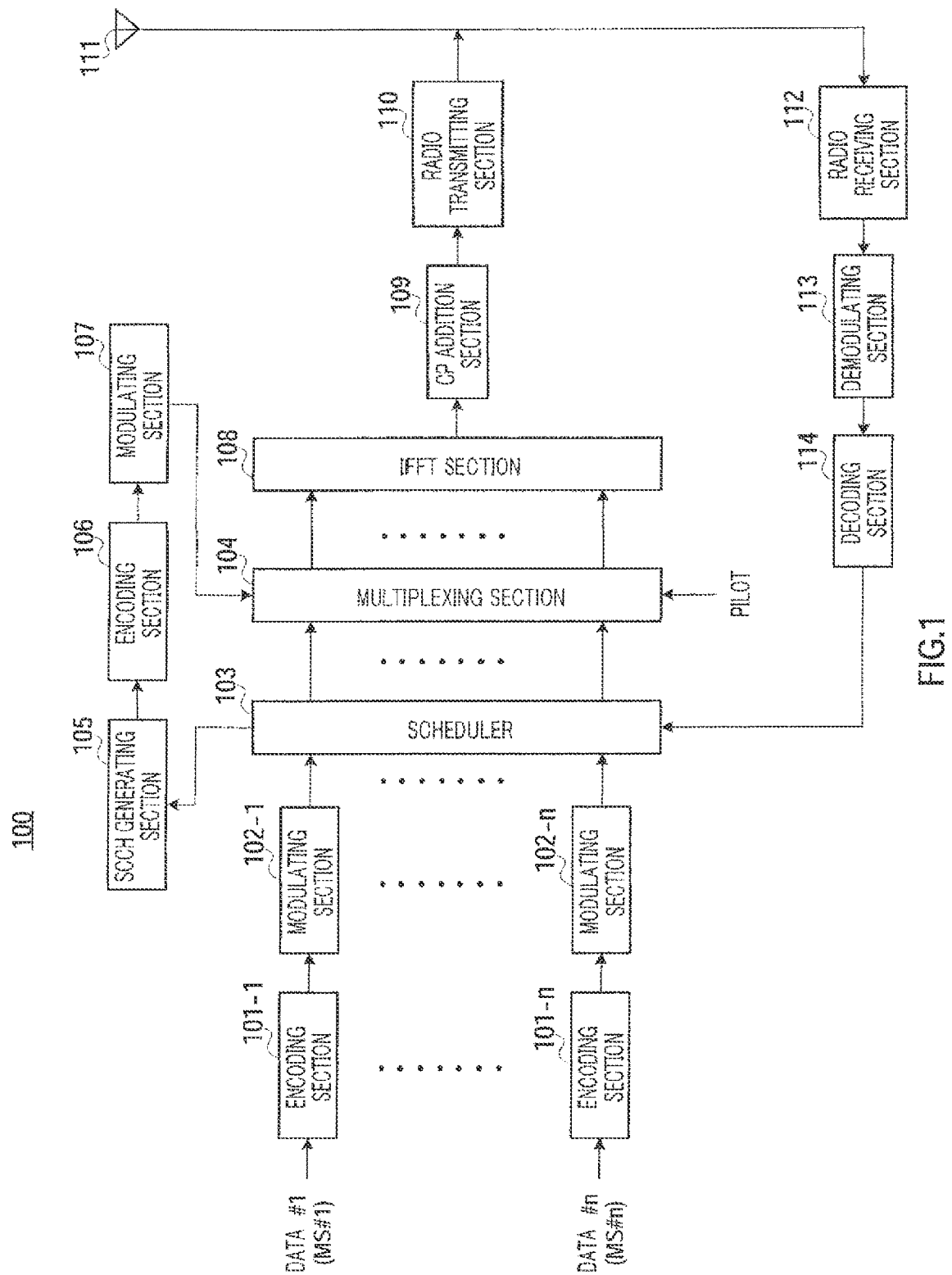
FIG. 1 is a block diagram showing a configuration of a base station according to an embodiment of the present invention.

FIG. 1 shows the configuration of base station 100 according to the present embodiment. Base station 100 is a base station used in a radio communication system where a plurality of subcarriers forming an OFDM symbol which is a multicarrier signal are divided into a plurality of RB's, and performs frequency scheduling using the plurality of RB's.

Base station 100 is configured with encoding sections 101-1 to 101-$n$ and modulating sections 102-1 to 102-$n$ in association with n mobile stations (MS's) with which base station 100 can communicate.

Encoding sections 101-1 to 101-$n$ perform encoding processing on data #1 to #n for mobile stations #1 to #n and modulating sections 102-1 to 102-$n$ perform modulation processing on the encoded data to generate data symbols.

Scheduler 103 performs frequency scheduling based on channel quality indicators (CQI's) from mobile stations, assigns data for mobile stations to RB's and outputs the data to multiplexing section 104. Examples of a CQI-based scheduling method include the Max CIR method and the proportional-fairness method. Furthermore, scheduler 103 outputs the assignment results (indicating the data symbols for which mobile stations are assigned to which RB's and subcarriers) to SCCH generating section 105.

Figures 2, 3:
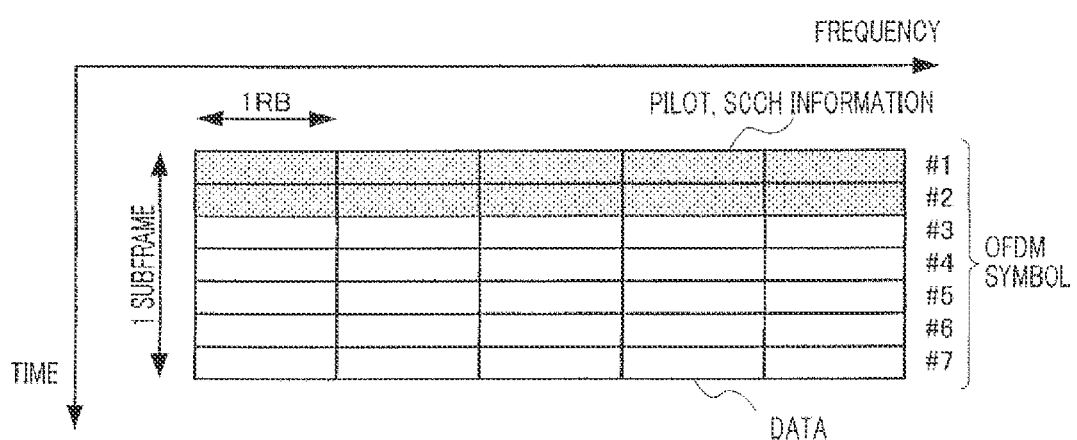
FIG. 2 is a format example of SCCH information according to an embodiment of the present invention.
FIG. 3 is a multiplexing example according to an embodiment of the present invention.

SCCH generating section 105 generates control information (SCCH information) to report the assignment results in scheduler 103 to mobile stations according to the format shown in FIG. 2. In the format shown in FIG. 2, the ID of the mobile station to which a data symbol is transmitted is set in "mobile station ID," information indicating localized assignment or distributed assignment (e.g., "0" in the case of localized assignment, "1" in the case of distributed assignment) is set in "assignment type" and information of a virtual resource block (VRB) assigned to the mobile station is set in "assignment VRB."

Encoding section 106 performs encoding processing on the SCCH information, and modulating section 107 performs modulation processing on the encoded SCCH information and outputs the resulting SCCH information to multiplexing section 104.

Multiplexing section 104 multiplexes the data symbols inputted from scheduler 103, SCCH information and pilots, and outputs the results to IFFT (Inverse Fast Fourier Transform) section 108. Here, the multiplexing of SCCH information and pilots is performed on a per subframe basis as shown in, for example, FIG. 3. FIG. 3 shows a case where one subframe is comprised of seven OFDM symbols, and, in this case, pilots and SCCH information are mapped to the first and second OFDM symbols and data is mapped to the third to seventh OFDM symbols.

IFFT section 108 performs an IFFT for a plurality of subcarriers to which SCCH information, pilots and data, symbols are assigned, to generate an OFDM symbol which is a multicarrier signal.

CP (Cyclic Prefix) addition section 109 adds the same signal as the rear end part of an OFDM symbol to the head of the OFDM symbol as a CP.

Radio transmitting section 110 performs transmission processing such as D/A conversion, amplification and up-conversion on the OFDM symbol with a CP and transmits the OFDM symbol from antenna 111 to mobile stations.

Radio receiving section 112 receives the CQI's transmitted from mobile stations through antenna 111 and performs reception processing such as down-conversion and D/A conversion. These CQI's are received quality information reported from the mobile stations. Further, each mobile station can measure received quality on a per RB basis using the received SNR, received SIR, received SINR, received CINR, received power, interference power, bit error rate, throughput and MCS whereby a predetermined error rate can be achieved. Furthermore, the CQI may also be referred to as "CSI" (Channel State Information).

Demodulating section 113 performs demodulation processing on the CQI's after the reception processing, and decoding section 114 performs decoding processing on the demodulated CQI's and outputs the decoded CQI's to scheduler 103.

Figure 4:
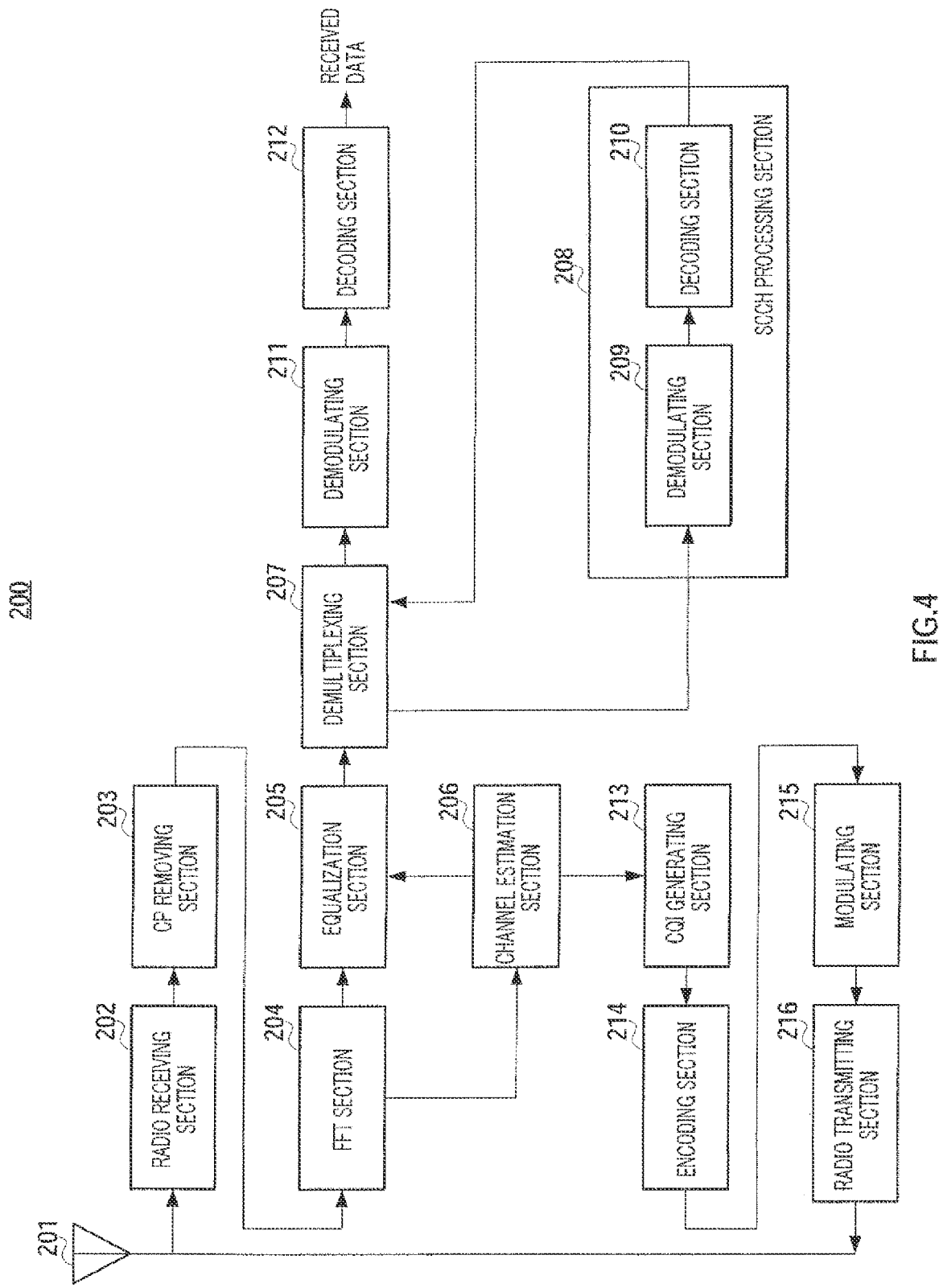
FIG. 4 is a block diagram showing a configuration of a mobile station according to an embodiment of the present invention.

Next, FIG. 4 shows the configuration of mobile station 200 according to the present embodiment.

In mobile station 200, radio receiving section 202 receives the OFDM symbol transmitted from base station 100 (FIG. 1) through antenna 201, performs reception processing such as down-conversion and D/A conversion and outputs the resulting OFDM symbol to CP removing section 203.

CP removing section 203 removes the CP added to the OFDM symbol and outputs the resulting OFDM symbol to FFT (Fast Fourier Transform) section 204.

FFT section 204 transforms the OFDM symbol into a frequency domain signal by performing an FFT on the OFDM symbol, and outputs the SCCH information and the data symbols of the signal to equalization section 205 and outputs the pilots to channel estimation section 206.

Channel estimation section 206 estimates the channel response on a per subcarrier basis using pilots, outputs the estimation result to equalization section 205, and also measures the received quality of each RB using the pilots and outputs the measurement result to CQI generating section 213.

Equalization section 205 compensates the channel fluctuation of SCCH information and data symbols based on the estimation result of the channel response and outputs the compensated SCCH information and data symbols to demultiplexing section 207.

Demultiplexing section 207 demultiplexes the SCCH information from the data symbol and outputs the SCCH information to demodulating section 209.

Demodulating section 209 performs demodulation processing on the SCCH information, and decoding section 210 performs decoding processing on the demodulated SCCH information and outputs the decoded SCCH information to demultiplexing section 207. Here, SCCH processing section 208 is configured with demodulating section 209 and decoding section 210.

Further, demultiplexing section 207 extracts only a data symbol directed to mobile station 200 from the data symbols inputted from equalization section 205 according to the decoded SCCH information, and outputs the extracted data symbol to demodulating section 211.

Demodulating section 211 demodulates the data symbol inputted from demultiplexing section 207 and outputs the demodulated data symbol to decoding section 212.

Decoding section 212 decodes the demodulated data symbol. By this means, received data is obtained.

CQI generating section 213 generates a CQI indicating the received quality of each RB measured by channel estimation section 206, and outputs the CQI to encoding section 214.

Encoding section 214 performs encoding processing on the CQI, and modulating section 215 performs modulation processing on the encoded CQI and outputs the modulated CQI to radio transmitting section 216.

Radio transmitting section 216 performs transmission processing such as D/A conversion, amplification and up-conversion on the modulated CQI and transmits the resulting CQI from antenna 201 to base station 100.

Next, a distributed assignment example of frequency scheduling performed in scheduler 103 of base station 100 will be explained in further detail. In the following explanation, assume that an OFDM symbol having a frequency bandwidth of 10 MHz is comprised of 96 subcarriers and assume a radio communication system in which the 96 subcarriers are divided into 24 physical resource blocks (PRB's) each containing four subcarriers.

Distributed Assignment Example 1

In this example, data directed to a mobile station is equally assigned to partial PRB's equally extracted from PRB's 1 to 24.

Figure 5:
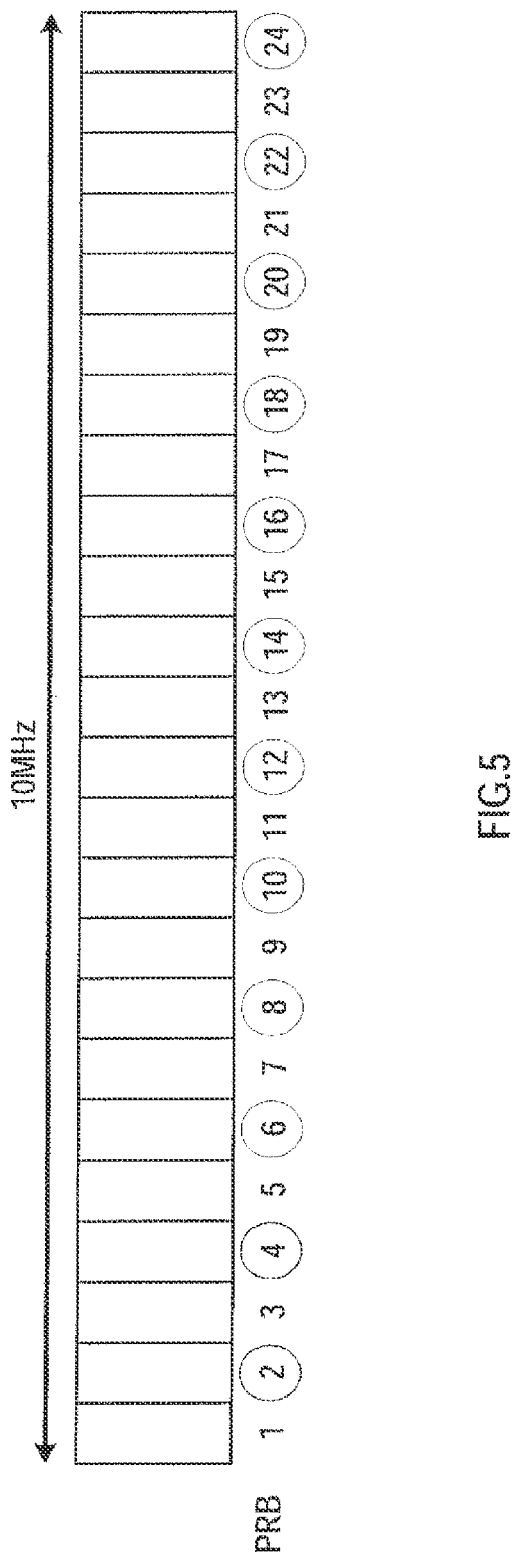
FIG. 5 is a PRB extraction example (distributed assignment example 1) according to an embodiment of the present invention.

In this example, as shown in FIG. 5, only the even-numbered PRB's are extracted from PRB's 1 to 24 having a frequency bandwidth of 10 MHz, and a subband for distributed assignment having a frequency bandwidth of 5 MHz is formed and set in scheduler 103. By extracting only the even-numbered PRB's, it is possible to form a subband for distributed assignment comprised of partial PRB's equally extracted from PRB's 1 to 24. Further, it is also possible to form a similar subband for distributed assignment by extracting only the odd-numbered PRB's.

Figure 6:
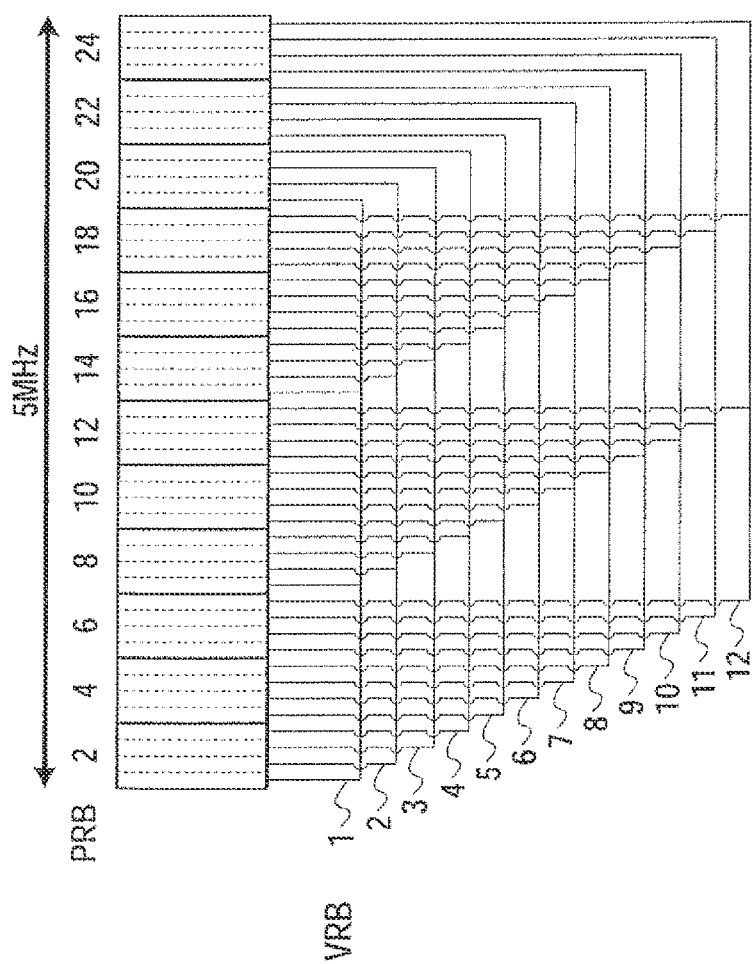
FIG. 6 is a VRB setting example (distributed assignment example 1) according to an embodiment of the present invention.

The plurality of PRB's forming a subband for distributed assignment are divided into VRB's 1 to 12 as shown in FIG. 6. For example, VRB 1 is comprised of the first subcarriers in PRB's 2, 8, 14 and 20, VRB 2 is comprised of the second subcarriers in PRB's 2, 8, 14 and 20, VRB 3 is comprised of the third subcarriers in PRB's 2, 8, 14 and 20, and VRB 4 is comprised of the fourth subcarriers in PRB's 2, 8, 14 and 20. Furthermore, VRB 5 is comprised of the first subcarriers in PRB's 4, 10, 16 and 22, VRB 6 is comprised of the second subcarriers in PRB's 4, 10, 16 and 22, VRB 7 is comprised of the third subcarriers in PRB's 4, 10, 16 and 22, and VRB 8 is comprised of the fourth subcarriers in PRB's 4, 10, 16 and 22. The same applies to VRB's 9 to 12.

Scheduler 103 assigns one of VRB's 1 to 12 to one mobile station by frequency scheduling and assigns data for the mobile station to a plurality of PRB's supporting the assigned VRB. For example, when scheduler 103 assigns VRB 1 to a certain mobile station, scheduler 103 assigns the data for the mobile station to the first subcarriers of PRB's 2, 8, 14 and 20. By such assignment, it is possible to equally assign data for a mobile station to a plurality of PRB's forming a subband for distributed assignment. Furthermore, scheduler 103 outputs the assignment result to SCCH generating section 105.

SCCH generating section 105 sets signaling bits associated with the VRB's assigned by scheduler 103 in "assignment VRB" in FIG. 2, according to the table shown in FIG. 7. For example, when VRB 1 is assigned to a certain mobile station, SCCH generating section 105 sets "0001" in "assignment VRB." Furthermore, in this case, SCCH generating section 105 sets "distributed assignment" in "assignment type."

Here, when VRB's are set for all PRB's 1 to 24 as described above, 24 VRB's (VRB's 1 to 24) are needed. In this case, the signaling bits shown in FIG. 7 are required for five bits. On the other hand, in the present example, VRB's are set for 12 PRB's extracted from PRB's 1 to 24. Therefore, according to the present example, as shown in FIG. 7, the signaling bits are required for only four bits. Thus, in the present example, it is possible to reduce an increase of the number of signaling bits by one bit in assignment for a mobile station. Therefore, in the entire assignment result report, it is possible to reduce an increase of the number of signaling bits by the number of bits corresponding to the number of mobile stations to which data is assigned.

In the present example, distributed assignment is performed for a subband comprised of partial PRB's which are equally extracted from PRB's 1 to 24 having a frequency bandwidth of 10 MHz, so that it is possible to obtain the similar frequency diversity effect as in the case where distributed assignment is performed for all of PRB's 1 to 24.

That is, according to the present example, even when the frequency bandwidth targeted for distributed assignment is widened from 5 MHz to 10 MHz to improve the frequency diversity effect in distributed assignment, it is possible to obtain a sufficient frequency diversity effect in frequency scheduling while reducing an increase of the overhead for reporting assignment results.

Distributed Assignment Example 2

Only the differences between distributed assignment example 2 and distributed assignment example 1 will be explained below.

Figure 8:
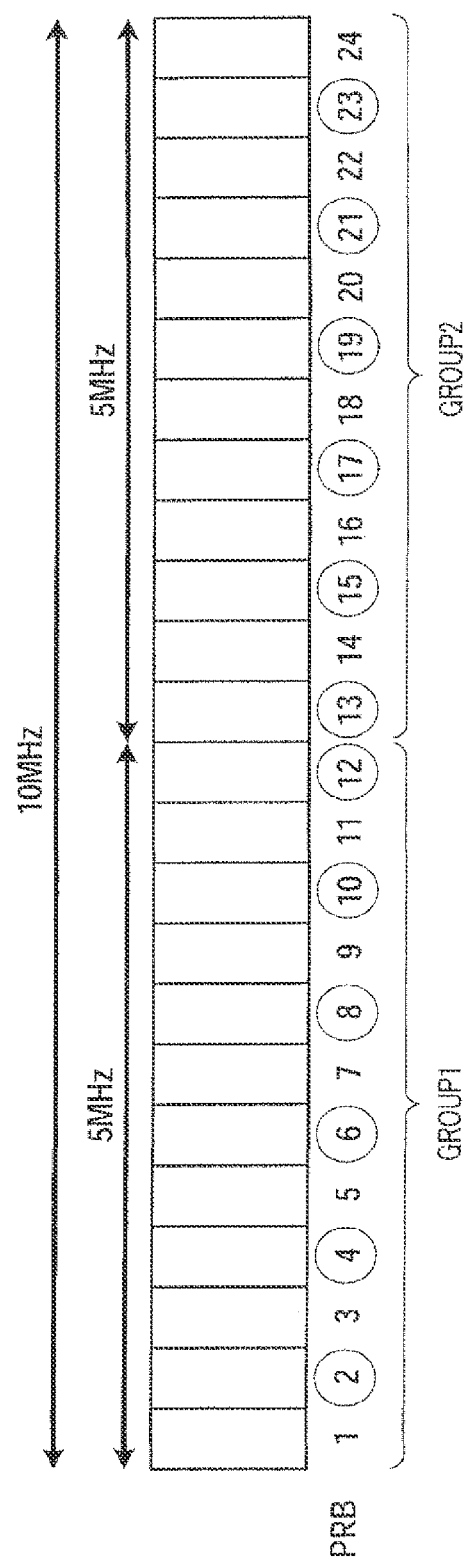
FIG. 8 is a PRB extraction example (distributed assignment example 2) according to an embodiment of the present invention.

As shown in FIG. 8, in the present example, PRB's 1 to 24 having a frequency bandwidth of 10 MHz are divided into two PRB groups each having a frequency bandwidth of 5 MHz. That is, PRB group 1 is comprised of PRB's 1 to 12 and PRB group 2 is comprised of PRB's 13 to 24.

As shown in FIG. 8, in the present example, only the even-numbered PRB's are extracted from PRB group 1 and only the odd-numbered PRB's are extracted from PRB group 2, and a subband for distributed assignment having a frequency bandwidth of 5 MHz is formed and set in scheduler 103. Even by such extraction method, it is possible to form a subband for distributed assignment using partial PRB's equally extracted from PRB's 1 to 24. Further, it is equally possible to form a similar subband for distributed assignment by extracting only the odd-numbered PRB's from PRB group 1 and extracting only the even-numbered PRB's from PRB group 2.

Figure 9:
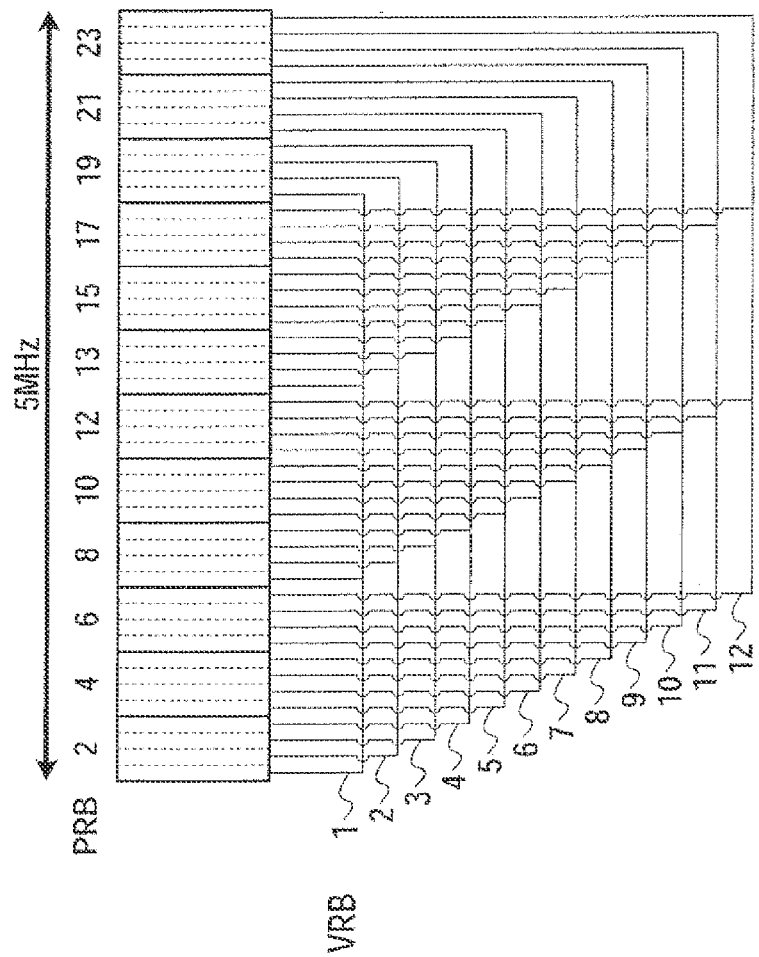
FIG. 9 is a VRB setting example (distributed assignment example 2) according to an embodiment of the present invention.

A plurality of PRB's forming a subband for distributed assignment are divided into VRB's 1 to 12 as shown in FIG. 9. For example, VRB 1 is comprised of the first subcarriers in PRB's 2, 8, 13 and 19, VRB 2 is comprised of the second subcarriers in PRB's 2, 8, 13 and 19, VRB 3 is comprised of the third subcarriers in PRB's 2, 8, 13 and 19, and VRB 4 is comprised of the fourth subcarriers in PRB's 2, 8, 13 and 19. Furthermore, VRB 5 is comprised of the first subcarriers in PRB's 4, 10, 15 and 21, VRB 6 is comprised of the second subcarriers in PRB's 4, 10, 15 and 21, VRB 7 is comprised of the third subcarriers in PRB's 4, 10, 15 and 21, and VRB 8 is comprised of the fourth subcarriers in PRB's 4, 10, 15 and 21. The same applies to VRB's 9 to 12.

Thus, according to the present example, the effects similar to those in distributed assignment example 1 can be obtained.

Distributed Assignment Example 3

Figure 10:
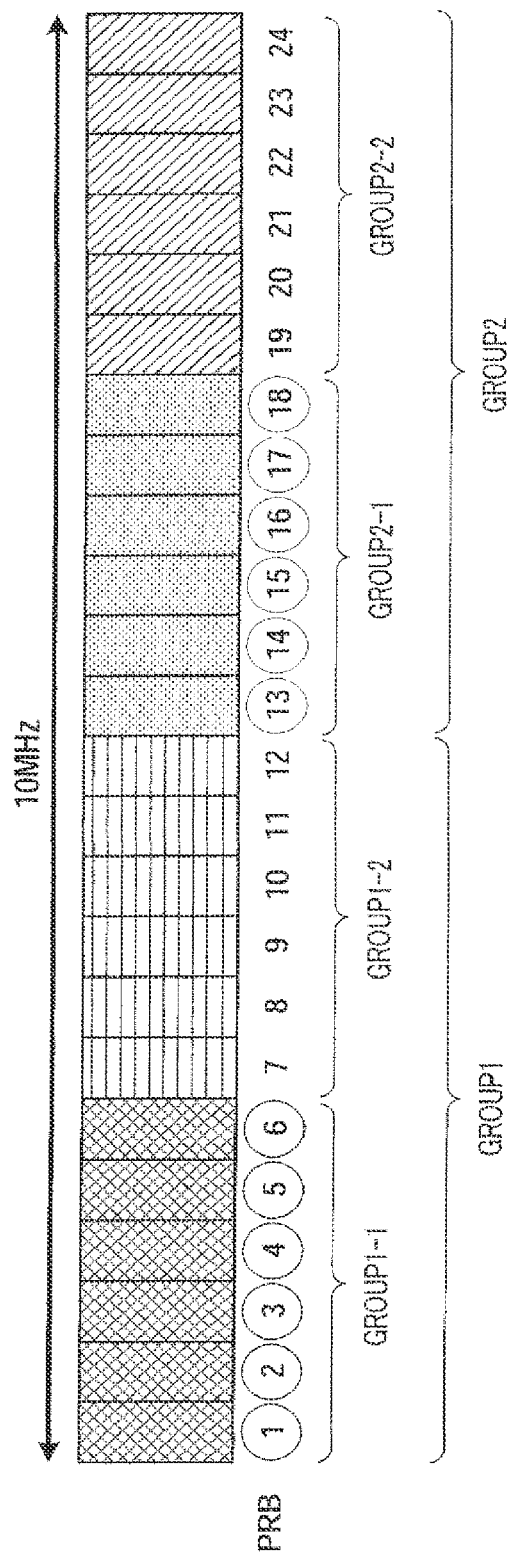
FIG. 10 is a PRB extraction example (distributed assignment example 3) according to an embodiment of the present invention.

In the present example, as shown in FIG. 10, by further dividing PRB groups 1 and 2 in distributed assignment example 2 into two PRB groups each having a frequency bandwidth of 2.5 MHz, PRB's 1 to 24 having a frequency bandwidth of 10 MHz are divided into four PRB groups each having a frequency bandwidth of 2.5 MHz. That is, in the present example, four PRB groups are formed including PRB group 1-1 comprised of PRB's 1 to 6, PRB group 1-2 comprised of PRB's 7 to 12, PRB group 2-1 comprised of PRB's 13 to 18 and PRB group 2-2 comprised of PRB's 19 to 24.

Further, in the present example, one of PRB groups 1-1 and 1-2 is extracted from PRB group 1 and one of PRB groups 2-1 and 2-2 is extracted from PRB group 2, and a subband for distributed assignment having a frequency bandwidth of 5 MHz is formed and set in scheduler 103. FIG. 10 shows a case where PRB group 1-1 is extracted from PRB group 1 and PRB group 2-1 is extracted from PRB group 2. Here, when PRB group 1-1 is extracted from PRB group 1, any of PRB groups 2-1 and 2-2 can be extracted from PRB group 2. However, when PRB group 1-2 is extracted from PRB group 1, PRB group 2-2 is extracted from PRB group 2 so as not to reduce the frequency diversity effect.

Figure 11:
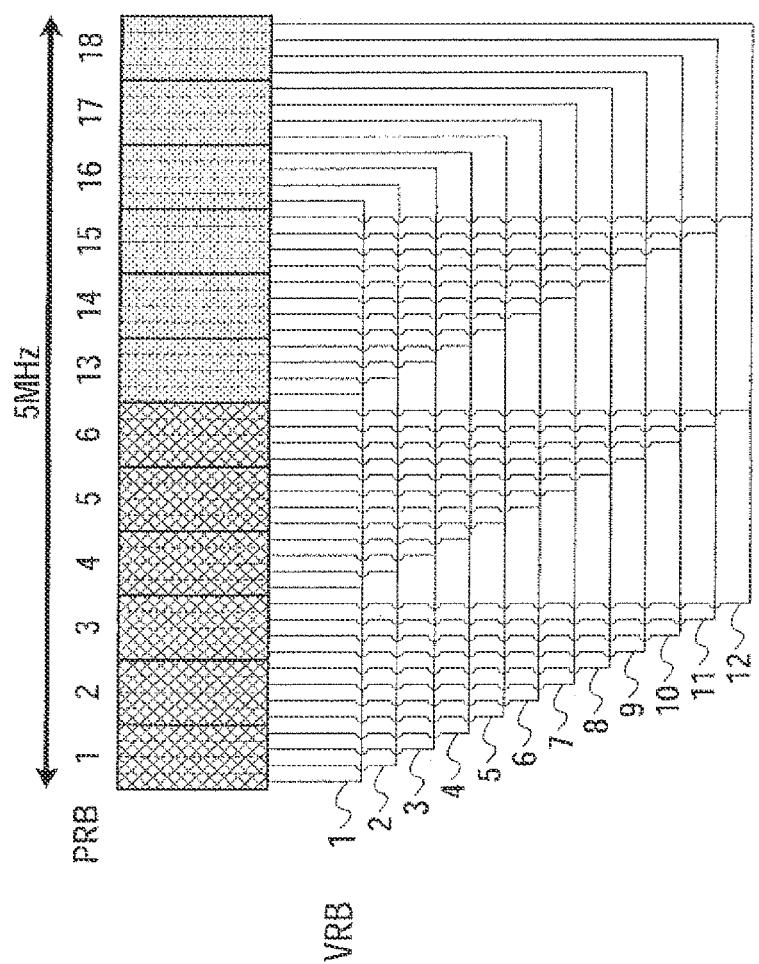
FIG. 11 is a VRB setting example (distributed assignment example 3) according to an embodiment of the present invention.

A plurality of PRB's forming a subband for distributed assignment are divided into VRB's 1 to 12 as shown in FIG. 11. For example, VRB 1 is comprised of the first subcarriers in PRB's 1, 4, 13 and 16, VRB 2 is comprised of the second subcarriers in PRB's 1, 4, 13 and 16, VRB 3 is comprised of the third subcarriers in PRB's 1, 4, 13 and 16, and VRB 4 is comprised of the fourth subcarriers in PRB's 1, 4, 13 and 16. Furthermore, VRB 5 is comprised of the first subcarriers in PRB's 2, 5, 14 and 17, VRB 6 is comprised of the second subcarriers in PRB's 2, 5, 14 and 17, VRB 7 is comprised of the third subcarriers in PRB's 2, 5, 14 and 17, and VRB 8 is comprised of the fourth subcarriers in PRB's 2, 5, 14 and 17. The same applies to VRB's 9 to 12.

In this way, according to the present example, a subband for distributed assignment is formed in units of PRB groups comprised of a plurality of consecutive subcarriers, and consecutive PRB groups are not extracted, so that it is possible to easily perform localized assignment and distributed assignment at the same time while suppressing a reduced frequency diversity effect.

Distributed Assignment Example 4

Figure 12:
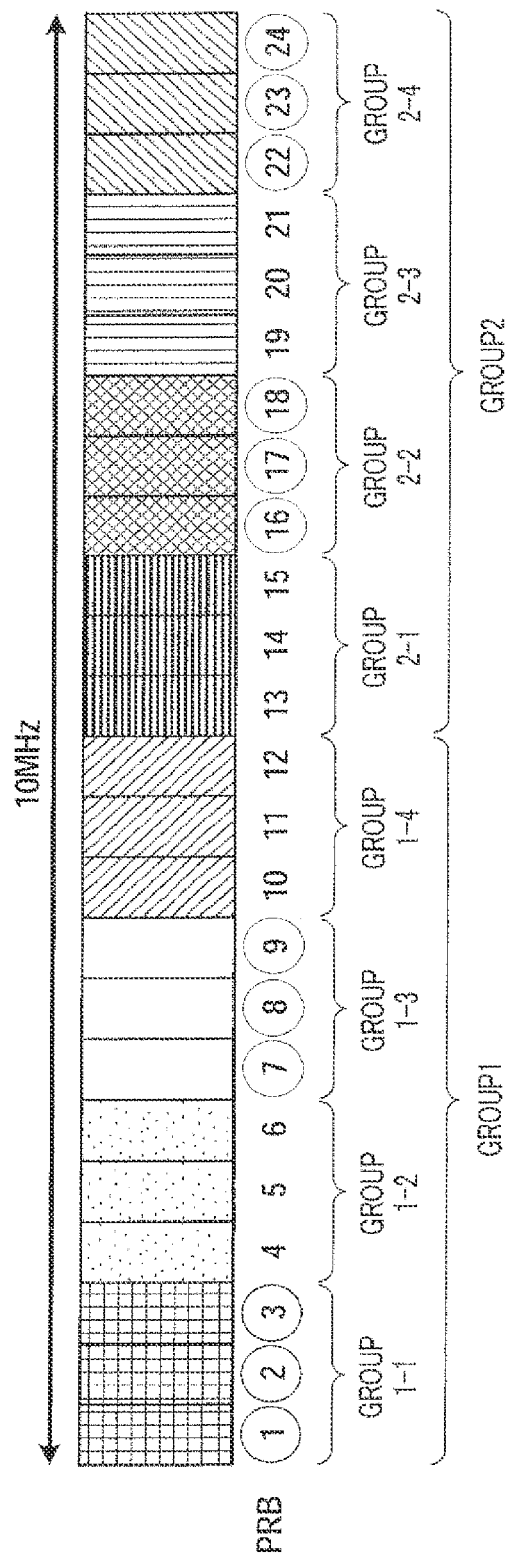
FIG. 12 is a PRB extraction example (distributed assignment example 4) according to an embodiment of the present invention.

In the present example, as shown in FIG. 12, by further dividing PRB groups 1 and 2 in distributed assignment example 2 into four PRB groups each having a frequency bandwidth of 1.25 MHz, PRB's 1 to 24 having a frequency bandwidth of 10 MHz are divided into eight PRB groups each having a frequency bandwidth of 1.25 MHz. That is, in the present example, the formed PRB groups are PRB group 1-1 comprised of PRB's 1 to 3, PRB group 1-2 comprised of PRB's 4 to 6, PRB group 1-3 comprised of PRB's 7 to 9, PRB group 1-4 comprised of PRB's 10 to 12, PRB group 2-1 comprised of PRB's 13 to 15, PRB group 2-2 comprised of PRB's 16 to 18, PRB group 2-3 comprised of PRB's 19 to 21, and PRB group 2-4 comprised of PRB's 22 to 24.

Further, in the present example, two PRB groups are extracted from PRB groups 1-1 to 1-4 of PRB group 1 and two PRB groups are extracted from PRB groups 2-1 to 2-4 of PRB group 2, and a subband for distributed assignment having a frequency bandwidth of 5 MHz is formed and set in scheduler 103. In this case, a subband for distributed assignment is formed with a combination other than combinations of PRB groups 1-3, 1-4, 2-1 and 2-2 so as not to reduce the frequency diversity effect. FIG. 12 shows a case where PRB groups 1-1 and 1-3 of PRB group 1 are extracted and PRB groups 2-2 and 2-4 of PRB group 2 are extracted.

Figure 13:
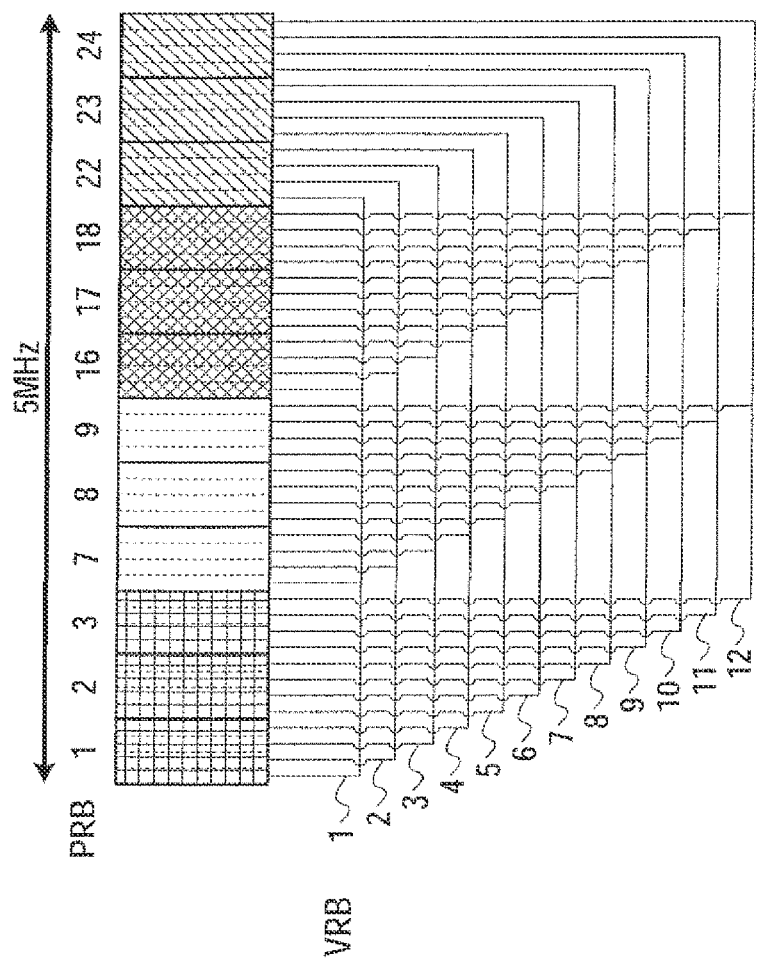
FIG. 13 is a VRB setting example (distributed assignment example 4) according to an embodiment of the present invention.

A plurality of PRB's forming a subband for distributed assignment are divided into VRB's 1 to 12 as shown in FIG. 13. For example, VRB 1 is comprised of the first subcarriers in PRB's 1, 7, 16 and 22, VRB 2 is comprised of the second subcarriers in PRB's 1, 7, 16 and 22, VRB 3 is comprised of the third subcarriers in PRB's 1, 7, 16 and 22 and VRB 4 is comprised of the fourth subcarriers in PRB's 1, 7, 16 and 22. Furthermore, VRB 5 is comprised of the first subcarriers in PRB's 2, 8, 17 and 23, VRB 6 is comprised of the second subcarriers in PRB's 2, 8, 17 and 23, VRB 7 is comprised of the third subcarriers in PRB's 2, 8, 17 and 23 and VRB 8 is comprised of the fourth subcarriers in PRB's 2, 8, 17 and 23. The same applies to VRB's 9 to 12.

In this way, according to the present example, the effects similar to those in distributed assignment example 3 can be obtained and a subband for distributed assignment can be formed with various combinations of PRB groups.

Distributed Assignment Example 5

Figure 14:
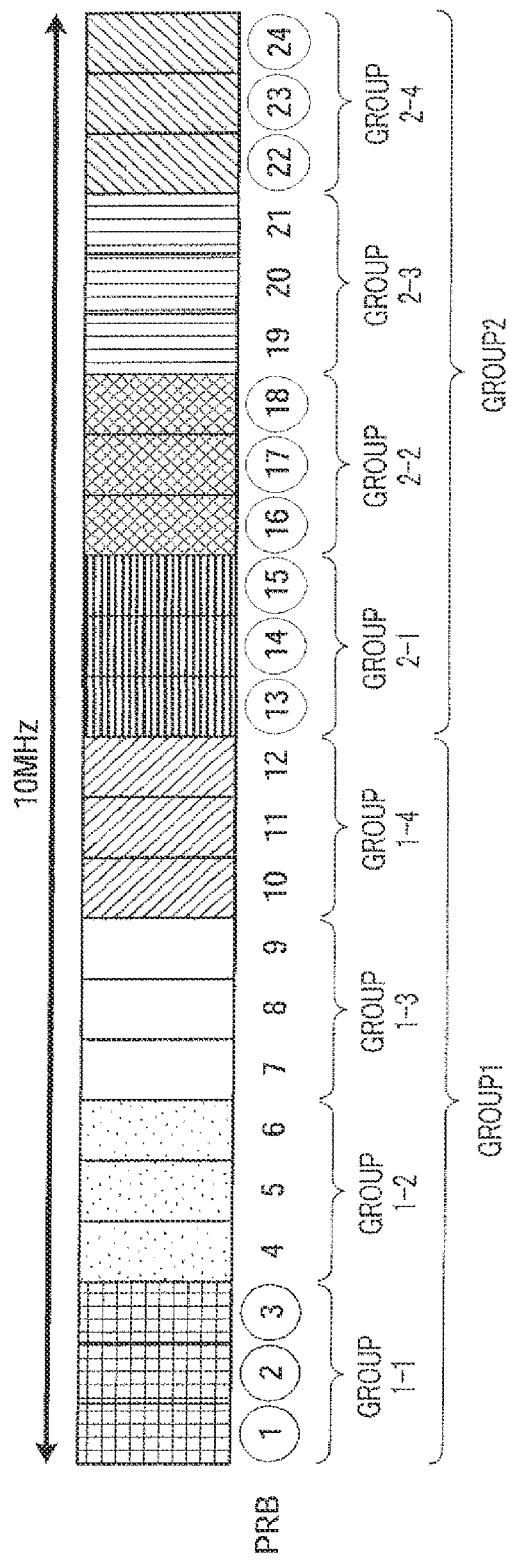
FIG. 14 is a PRB extraction example (distributed assignment example 5) according to an embodiment of the present invention.

In the present example, as shown in FIG. 14, PRB groups 1 and 2 are further divided into four PRB groups each having a frequency bandwidth of 1.25 MHz in the same way as distributed assignment example 4.

In the present example, one PRB group is extracted from PRB groups 1-1 to 1-4 of PRB group 1 and three PRB groups are extracted from PRB groups 2-1 to 2-4 of PRB group 2, and a subband for distributed assignment having a frequency bandwidth of 5 MHz is formed and set in scheduler 103. In this case, a subband for distributed assignment is formed with a combination other than combinations of PRB groups 1-4, 2-1, 2-2, 2-3 so as not to reduce the frequency diversity effect. FIG. 14 shows a case where PRB group 1-1 of PRB group 1 is extracted and PRB groups 2-1, 2-2 and 2-4 of PRB group 2 are extracted.

Further, it is also possible to extract three PRB groups from PRB groups 1-1 to 1-4 of PRB group 1 and extract one PRB group from PRB groups 2-1 to 2-4 of PRB group 2. However, a subband for distributed assignment is formed with a combination other than combinations of PRB groups 1-2, 1-3, 1-4, 2-1 so as not to reduce the frequency diversity effect.

Figure 15:
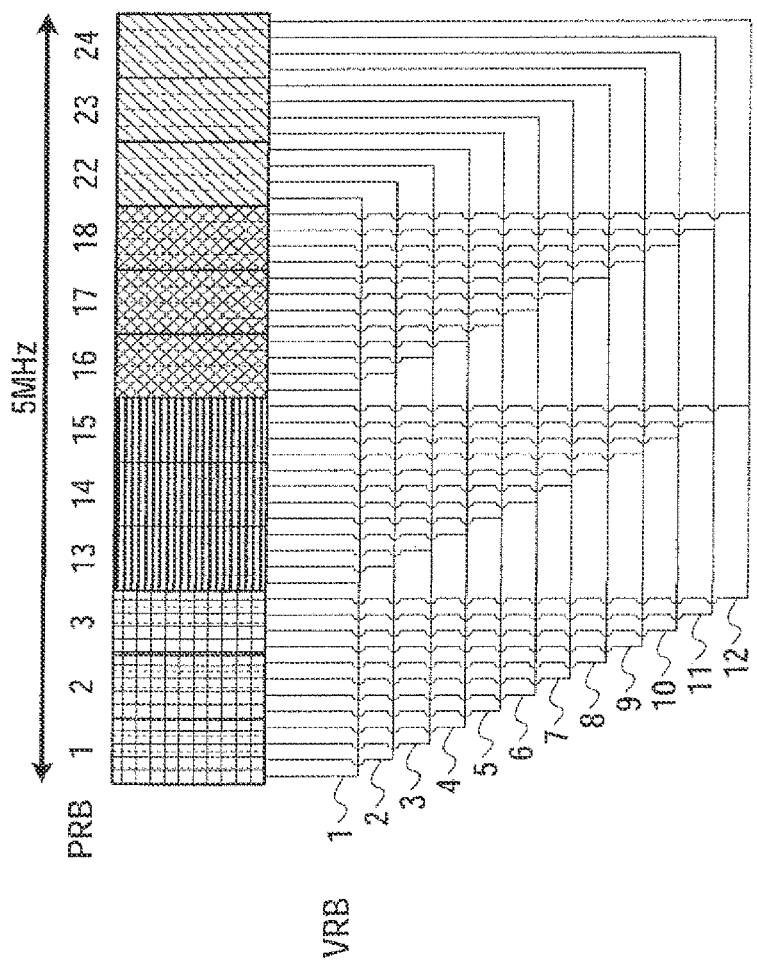
FIG. 15 is a VRB setting example (distributed assignment example 5) according to an embodiment of the present invention.

A plurality of PRB's forming a subband for distributed assignment are divided into VRB's 1 to 12 as shown in FIG. 15. For example, VRB 1 is comprised of the first subcarriers in PRB's 1, 13, 16 and 22, VRB 2 is comprised of the second subcarriers in PRB's 1, 13, 16 and 22, VRB 3 is comprised of the third subcarriers in PRB's 1, 13, 16 and 22, and VRB 4 is comprised of the fourth subcarriers in PRB's 1, 13, 16 and 22. Furthermore, VRB 5 is comprised of the first subcarriers in PRB's 2, 14, 17 and 23, VRB 6 is comprised of the second subcarriers in PRB's 2, 14, 17 and 23, VRB 7 is comprised of the third subcarriers in PRB's 2, 14, 17 and 23, and VRB 8 is comprised of the fourth subcarriers in PRB's 2, 14, 17 and 23. The same applies to VRB's 9 to 12.

In this way, according to the present example, the effects similar to those of distributed assignment example 4 can be obtained.

Distributed Assignment Example 6

In the present example, only the even-numbered PRB's are extracted from PRB's 1 to 24 to form subband 1 for distributed assignment having a frequency bandwidth of 5 MHz (FIG. 6) and only the odd-numbered PRB's are extracted from PRB's 1 to 24 to form subband 2 for distributed assignment having a frequency bandwidth of 5 MHz (FIG. 16), and these subbands are set in scheduler 103. Further, SCCH's 1 and 2 are set in association with subbands 1 and 2, respectively. That is, while one SCCH of 5 MHz is used in distributed assignment examples 1 to 5, two SCCH's of 5 MHz are used in the present example, the assignment result of subband 1 for distributed assignment is reported using SCCH 1, and the assignment result of subband 2 for distributed assignment is reported using SCCH 2.

Figure 16:
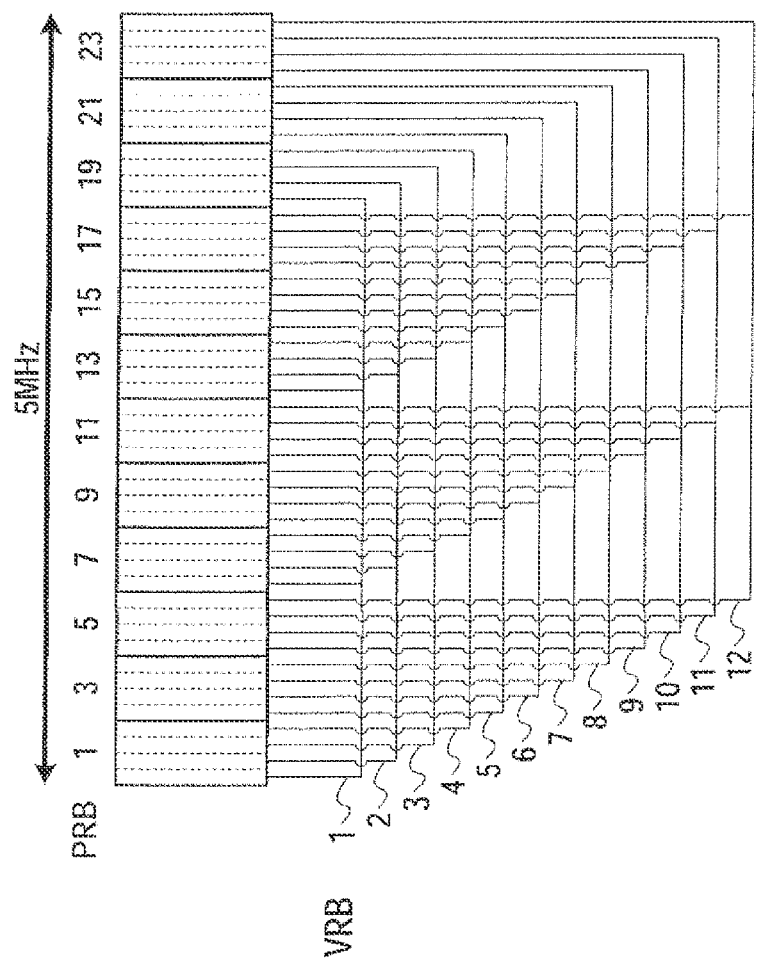
FIG. 16 is a VRB setting example (distributed assignment example 6) according to an embodiment of the present invention.

A plurality of PRB's forming subband 1 for distributed assignment are divided into VRB's 1 to 12 as shown in FIG. 6. Likewise, a plurality of PRB's forming subband 2 for distributed assignment are divided into VRB's 1 to 12 as shown in FIG. 16.

Scheduler 103 assigns one of VRB's 1 to 12 of subband 1 or 2 for distributed assignment, to one mobile station by frequency scheduling, and assigns data for the mobile station to a plurality of PRB's supporting the assigned VRB. For example, when scheduler 103 assigns VRB 1 of subband 1 for distributed assignment to a certain mobile station, scheduler 103 assigns data for the mobile station to first subcarriers of PRB's 2, 8, 14 and 20. Furthermore, for example, when scheduler 103 assigns VRB 1 of subband 2 for distributed assignment, to a certain mobile station, scheduler 103 assigns data for the mobile station to first subcarriers of PRB's 1, 7, 13 and 19. Scheduler 103 then outputs the assignment result to SCCH generating section 105.

As described above, SCCH generating section 105 sets signaling bits in association with VRB's assigned by scheduler 103, in "assignment VRB" in FIG. 2. For example, when VRB 1 of subband 1 for distributed assignment is assigned to a certain mobile station, SCCH generating section 105 generates SCCH 1 in which "0001" is set in "assignment VRB." Furthermore, for example, when VRB 1 of subband 2 is assigned to a certain mobile station, SCCH generating section 105 generates SCCH 2 in which "0001" is set in "assignment VRB."

In this way, according to the present example, two subbands for distributed assignment each having a frequency bandwidth of 5 MHz are formed and assignment results are reported using two SCCH's associated with these two subbands for distributed assignment, so that it is possible to target all PRB's 1 to 24 having a frequency bandwidth of 10 MHz for distributed assignment while making signaling bits of "VRB assignment" the same as in distributed assignment examples 1 to 5.

Although a case has been described with the present example where SCCH's 1 and 2 set in different frequency bands are associated with subbands 1 and 2, respectively, such that subbands 1 and 2 are identified from SCCH's 1 and 2, it is also possible to add information to identify subbands 1 and 2, to the SCCH information shown in FIG. 2 to identify subbands 1 and 2.

Distributed assignment examples 1 to 6 have been explained above.

Next, frequency scheduling will be explained where both distributed assignment and localized assignment are taken into consideration. Here, assume that there are mobile station A to which distributed assignment is applied and mobile station B to which localized assignment is applied.

Figure 17:
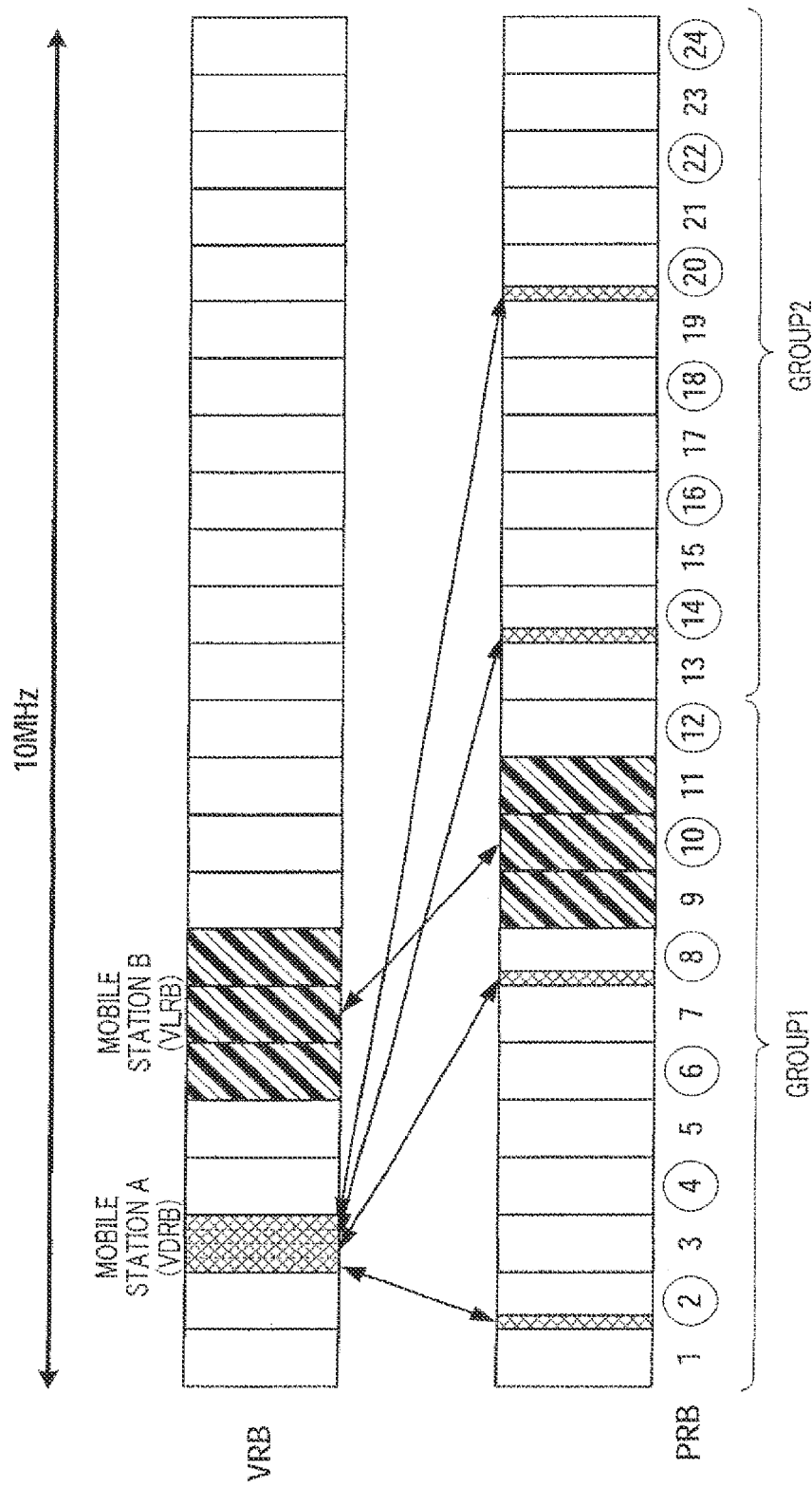
FIG. 17 is a frequency scheduling example according to an embodiment of the present invention.

As shown in FIG. 17, for mobile station A, scheduler 103 performs distributed assignment for arbitrary VRB's in FIG. 6 based on distributed assignment example 1. Here, assume that a VDRB (Virtual Distributed Resource Block) assigned to mobile station A is comprised of first subcarriers of PRB's 2, 8, 14 and 20.

On the other hand, for mobile station B, assume that PRB group 1 (FIG. 8) defined in distributed assignment example 2 is a subband for localized assignment. Further, scheduler 103 performs localized assignment as shown in FIG. 17. Here, assume that a VLRB (Virtual Localized Resource Block) assigned to mobile station B is comprised of PRB's 9, 10 and 11.

In this way, a subband for distributed assignment is formed with PRB's of 5 MHz equally extracted to obtain a sufficient frequency diversity effect, while a subband for localized assignment is formed with consecutive PRB's of 5 MHz to obtain a sufficient frequency scheduling effect. By this means, it is possible to make the number of signaling bits in the assignment result of distributed assignment the same as the number of signaling bits in the assignment result of localized assignment. Furthermore, when both distributed assignment and localized assignment are performed at the same time in frequency scheduling, PRB's subjected to the distributed assignment are not made to overlap with PRB's subjected to the localized assignment.

The current 3GPP LTE standardization studies the OFDM-based mobile communication system in which a plurality of mobile stations having mutually different frequency bandwidths can be used. More specifically, studies are underway for the mobile communication system having a frequency bandwidth of 20 MHz in which a plurality of mobile stations having communication capacities of 10 MHz, 15 MHz and 20 MHz can be used. In such a mobile communication system, a 5 MHz×2 (10 MHz) bandwidth out of the 20 MHz bandwidth is assigned to a mobile station having a 10 MHz communication capacity (10 MHz mobile station), and a 5 MHz×3 (15 MHz) bandwidth out of the 20 MHz bandwidth is assigned to a mobile station having a 15 MHz communication capacity (15 MHz mobile station). Furthermore, a mobile station having a 20 MHz communication capacity (20 MHz mobile station) can use a 5 MHz×4 (entire 20 MHz) bandwidth. Therefore, taking into consideration that the present invention is applied to such a mobile communication system, in the present embodiment, the frequency bandwidth of a subband for distributed assignment comprised of partial PRB's is set to 5 MHz. By this means, it is possible to perform the above distributed assignment for a 10 MHz mobile station, 15 MHz mobile station and 20 MHz mobile station.

An embodiment of the present invention has been explained as above.

A mobile station may also be referred to as "UE," a base station apparatus as "Node B," and a subcarrier as "tone." Furthermore, an RB may be referred to as "subchannel," "subcarrier block," "subband" or "chunk." Furthermore, a CP may be referred to as "guard interval (GI)."

Furthermore, the assignment result of frequency scheduling may be reported to a mobile station using a physical downlink control channel (PDDCH) instead of an SCCH.

Furthermore, the definition of a subband for distributed assignment may be set in both a base station and a mobile station beforehand or may be reported from the base station to the mobile station. This report may be performed using a broadcast channel or the SCCH of each subframe.

Although an example has been described with the above embodiment where PRB's of 5 MHz are extracted from a frequency bandwidth of 10 MHz, the present invention can also be implemented in the same way as above even when PRB's of 10 MHz are extracted from a frequency bandwidth of 20 MHz.

Furthermore, in the above embodiment, although VRB's are set by combining a plurality of resources obtained by dividing one PRB into four portions, the number of divisions of one PRB is not limited to four.

Furthermore, although an example case has been described with the above embodiment where even-numbered PRB's or odd-numbered PRB's are extracted, that is, where every second PRB is extracted, every third or every fourth PRB may be extracted.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to perform function block integration using this technology. Application of biotechnology is also possible.

The disclosure of Japanese Patent Application No. 2006-126454, filed on Apr. 28, 2006, including the specification, drawings and abstract, is incorporated herein by reference in its entirety.

INDUSTRIAL APPLICABILITY

The present invention is applicable to a mobile communication system or the like.

The invention claimed is:
1. A system comprising a mobile station and a base station, wherein,
the base station comprising:
circuitry, which, in operation, allocate one or more resource blocks according to one of a first allocation and a second allocation to the mobile station; and
a transmitter, which, in operation, transmits, to the mobile station, control information that includes assignment information indicating the allocated one or more resource blocks, and that includes information indicating said one of the first allocation and the second allocation, and
the mobile station comprising:
a receiver, which, in operation, receives the control information; and
circuitry, which, in operation, decodes data based on the control information,
wherein:
a plurality of subcarriers that are consecutive in a frequency domain form one resource block, a determined number of resource blocks that are consecutive in the frequency domain form a group, and a plurality of groups exist;
in the first allocation, first groups that are inconsecutive in the frequency domain form a first subset of the plurality of groups, second groups that are inconsecutive in the frequency domain form a second subset of the plurality of groups, the first subset and the second subset are different from each other, and the assignment information indicates the allocated one or more resource blocks from one of the first subset and the second subset;
in the second allocation, the assignment information indicates the allocated one or more resource blocks that are consecutive in the frequency domain; and
the assignment information has the same number of bits in the first allocation and the second allocation.
2. The system according to claim 1, wherein the assignment information indicates one or more groups, which include the allocated one or more resource blocks, of the plurality of groups.

3. The system according to claim 1, wherein, in the first allocation, the assignment information indicates one of the first subset and the second subset, which includes the allocated one or more resource blocks.

4. The system according to claim 1, wherein the information indicating one of the first allocation and the second allocation is represented by 1 bit.

5. The system according to claim 1, wherein each of the plurality of groups is formed of the same determined number of resource blocks.

6. The system according to claim 1, wherein the determined number is variable.

7. The system according to claim 1, wherein, in the first allocation, the first groups and the second groups are formed alternately in the frequency domain.

8. The system according to claim 1, wherein, in the first allocation, the first groups and the second groups are mutually exclusive in the frequency domain.

9. The system according to claim 1, wherein, in the second allocation, the allocated one or more resource blocks are included in one or more groups of the plurality of groups.

10. A communication method, comprising:
    allocating, by a base station, one or more resource blocks according to one of a first allocation and a second allocation to a mobile station;
    transmitting, from the base station to the mobile station, control information that includes assignment information indicating the allocated one or more resource blocks, and that includes information indicating said one of the first allocation and the second allocation;
    receiving, by the mobile station, the control information; and
    decoding, by the mobile station, data based on the control information,
    wherein:
    a plurality of subcarriers that are consecutive in a frequency domain form one resource block, a determined number of resource blocks that are consecutive in the frequency domain form a group, and a plurality of groups exist;
    in the first allocation, first groups that are inconsecutive in the frequency domain form a first subset of the plurality of groups, second groups that are inconsecutive in the frequency domain form a second subset of the plurality of groups, the first subset and the second subset are different from each other, and the assignment information indicates the allocated one or more resource blocks from one of the first subset and the second subset;
    in the second allocation, the assignment information indicates the allocated one or more resource blocks that are consecutive in the frequency domain; and
    the assignment information has the same number of bits in the first allocation and the second allocation.

11. The communication method according to claim 10, wherein the assignment information indicates one or more groups, which include the allocated one or more resource blocks, of the plurality of groups.

12. The communication method according to claim 10, wherein, in the first allocation, the assignment information indicates one of the first subset and the second subset, which includes the allocated one or more resource blocks.

13. The communication method according to claim 10, wherein the information indicating one of the first allocation and the second allocation is represented by 1 bit.

14. The communication method according to claim 10, wherein each of the plurality of groups is formed of the same determined number of resource blocks.

15. The communication method according to claim 10, wherein the determined number is variable.

16. The communication method according to claim 10, wherein, in the first allocation, the first groups and the second groups are formed alternately in the frequency domain.

17. The communication method according to claim 10, wherein, in the first allocation, the first groups and the second groups are mutually exclusive in the frequency domain.

18. The communication method according to claim 10, wherein, in the second allocation, the allocated one or more resource blocks are included in one or more groups of the plurality of groups.

* * * * *